United States Patent
Hsiao et al.

(10) Patent No.: US 7,506,431 B2
(45) Date of Patent: Mar. 24, 2009

(54) METHOD OF MANUFACTURING A PERPENDICULAR MAGNETIC WRITE HEAD HAVING A WRAP-AROUND TRAILING SHIELD AND A CONCAVE TRAILING EDGE MAIN POLE

(75) Inventors: Wen-Chien David Hsiao, San Jose, CA (US); Yimin Hsu, Sunnyvale, CA (US); Vladimir Nikitin, Campbell, CA (US); Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/744,022

(22) Filed: May 3, 2007

(65) Prior Publication Data

US 2008/0271308 A1 Nov. 6, 2008

(51) Int. Cl.
*G11B 5/127* (2006.01)
*H04R 31/00* (2006.01)

(52) U.S. Cl. .............. 29/603.16; 29/603.13; 29/603.14; 29/603.15; 29/603.18; 205/119; 205/122; 216/62; 216/65; 216/66; 360/121; 360/122; 360/317; 451/5; 451/41

(58) Field of Classification Search . 29/603.13–603.16, 29/603.18; 360/121, 122, 317; 205/119, 205/122; 451/5, 41
See application file for complete search history.

(56) References Cited

U.S. PATENT DOCUMENTS

2007/0245545 A1* 10/2007 Pentek et al. ............. 29/603.13
2007/0258167 A1* 11/2007 Allen et al. ................ 360/126

* cited by examiner

*Primary Examiner*—Paul D Kim
(74) *Attorney, Agent, or Firm*—Zilka-Kotab, PC

(57) ABSTRACT

A method for manufacturing a magnetic write head for perpendicular magnetic recording. The method allows the write head to be formed with a write pole having a concave trailing edge. The method further allows the amount of concavity of the trailing edge to be accurately and carefully controlled both within a wafer and between wafers. A write pole is formed using a mask that includes a hard mask, a RIEable layer and an endpoint detection layer. A layer of non-magnetic material (ALD layer) is deposited, and then, an ion milling process is used to remove a portion of the ALD layer disposed over the write pole and mask. A reactive ion etch process is performed to remove the RIEable layer leaving the ALD layer to form non-magnetic side walls with upper portions that extend above the write pole. Another ion milling is then performed, preferably at an angle relative to normal, such that shadowing from the upper portions of the non-magnetic side walls causes the ion milling to form the write pole with a concave trailing edge.

21 Claims, 14 Drawing Sheets

METHOD OF MANUFACTURING A PERPENDICULAR MAGNETIC WRITE HEAD HAVING A WRAP-AROUND TRAILING SHIELD AND A CONCAVE TRAILING EDGE MAIN POLE

This invention is related to commonly assigned patent application Ser. No. 11/411,556 entitled PERPENDICULAR MAGNETIC WRITE HEAD HAVING A MAGNETIC WRITE POLE WITH A CONCAVE TRAILING EDGE, Filed on Apr. 25, 2006 which is incorporated herein by reference, and to commonly assigned patent application Ser. No. 11/286,077, entitled WRITE HEAD DESIGN AND METHOD FOR REDUCING ADJACENT TRACK INTERFERENCE AT VERY NARROW TRACK WIDTHS, filed Nov. 23, 2005 which is incorporated herein by reference.

FIELD OF THE INVENTION

The present invention relates to perpendicular magnetic recording and more particularly to a reliable method for manufacturing a perpendicular magnetic write head having a write pole with a concave trailing edge and having a wrap-around trailing magnetic shield.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a tree layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an anti-ferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to be antiparallel coupled to the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (API) with a layer of anti ferromagnetic material such as PtMn. While an anti ferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "cant" the write field being emitted from the write pole. Canting the write field at an angle relative to the normal of the medium makes the magnetic moment of the medium easier to switch by reducing the switching field. Modeling has shown that a single pole writer in a perpendicular recording system can exhibit improved transition sharpness (ie better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

The trailing shield can be a floating design, in that the magnetic trailing shield is not directly, magnetically connected with the other structures of the write head. Magnetic field from the write pole results in a flux in the shield that essentially travels through the magnetic medium back to the return pole of the write head. The trailing shield can also be designed to magnetically connect with other magnetic structures of the write head such as the return pole. Various dimensions of the shield are critical for the trailing shield to operate correctly. For instance, effective angling or canting of the effective flux field is optimized when the write pole to trailing shield separation (gap) is about equal to the head to soft underlayer spacing (HUS) and the trailing shield throat height is preferably roughly equal to half the track-width of the write pole. This design improves write field gradient at the expense of effective flux field. To minimize effective flux field lost to the trailing shield and still achieve the desired effect, the gap and shield thickness are adjusted to minimize saturation at the shield and effective flux field lost to the shield respectively. In order for a trailing shield to function optimally, the thickness of the trailing shield gap must be tightly controlled. Therefore, there is a need for a means for accurately controlling such trailing gap thickness during manufacture.

It is difficult, however, to construct a write head having a desired write pole shape with tightly controlled critical dimensions, while also constructing a trailing shield with a desired well controlled trailing shield gap thickness. Furthermore, write pole and shield configurations are needed that can maximize the performance of the write pole while minimizing field lost to the trailing shield. In addition the critical dimensions of the write pole itself must be well defined. Furthermore, the write pole should be configured so as to maximize the magnetic performance of the write head, such as by minimizing transition curvature. Therefore, there is a need for a method or design for constructing a write head that can meet these all of these needs. Such a design or method must be manufacturable, allowing the write head to manufactured in large hatch manufacturing processes, without incurring significant additional manufacturing expense or complexity.

SUMMARY OF THE INVENTION

The present invention provides a method for manufacturing a magnetic write head for use in perpendicular magnetic recording, the write head having a write pole with a concave trailing edge and having a magnetic, trailing, wrap around shield. A write pole is formed having a mask structure formed over the write pole layer. The mask structure includes a hard mask layer, a RIEable layer and an endpoint detection layer. A layer of magnetic material (ALD layer) is deposited, and then an ion milling is performed to open up the mask structure. A reactive ion etch is performed to remove the RIEable layer, and another ion milling is performed to form the write pole with a concave trailing edge.

The removal of the REIable layer leaves the remaining ALD layer to form non-magnetic side walls with upper portions that extend above the top of the write pole. The ion milling used to form the write pole with a concave trailing edge can be performed at an angle relative to normal. During ion milling, shadowing from the upper portions of the non-magnetic side walls causes the ion milling to remove material from the center of the write pole at a faster rate than at the sides of the write pole, resulting in the above mentioned trailing shield concavity. Therefore, the amount of concavity of the trailing edge of the write pole can be controlled by at least two parameters, the height of the upper portion of the non-magnetic side walls (which can be accurately and reliably controlled by controlling the thickness of the RIEable layer) and the angle at which the ion milling is performed.

The concavity of the trailing edge of the write pole advantageously improves the performance. For example, the concavity of the trailing edge improves the transition curvature of the write head.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
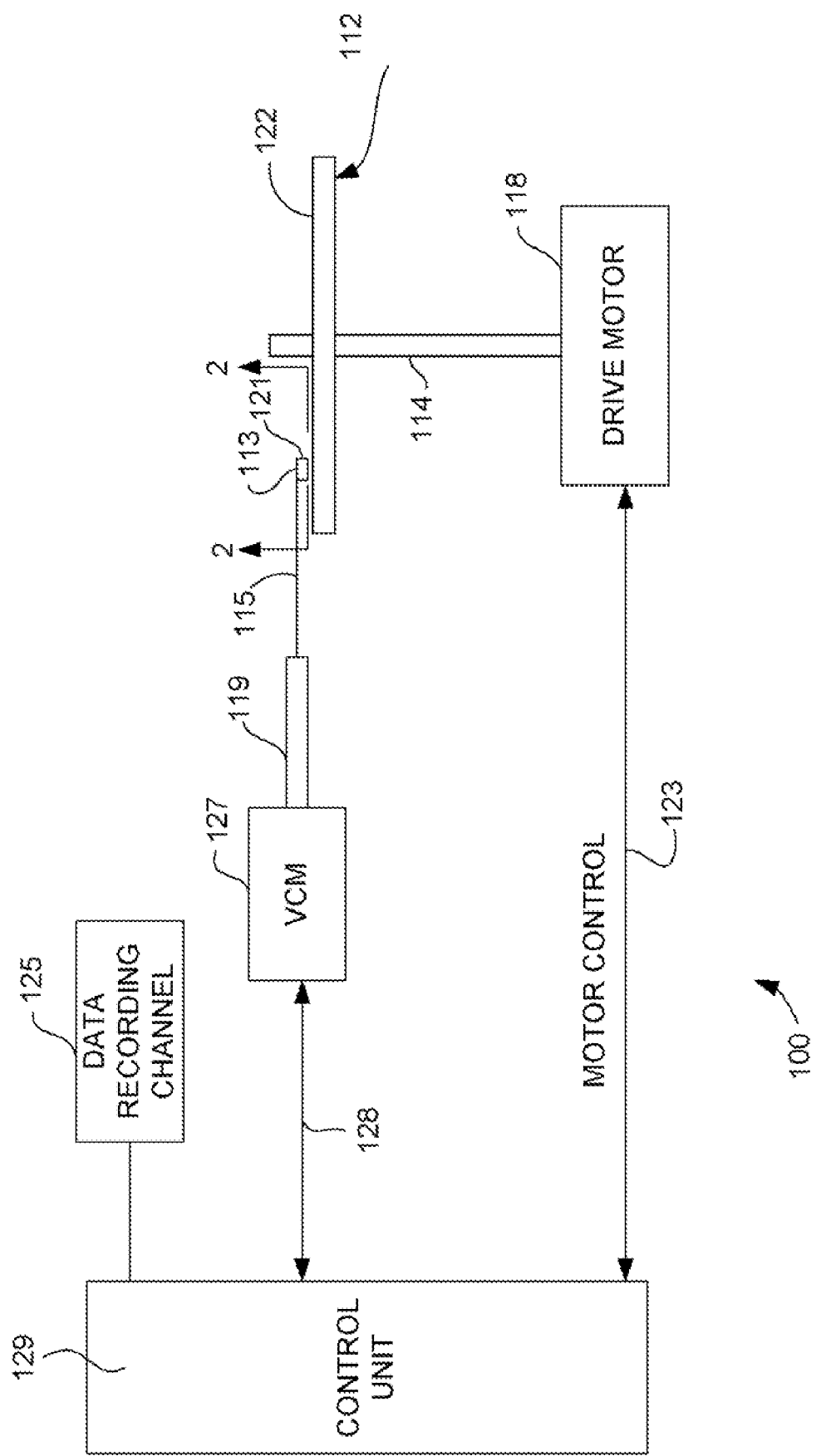
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
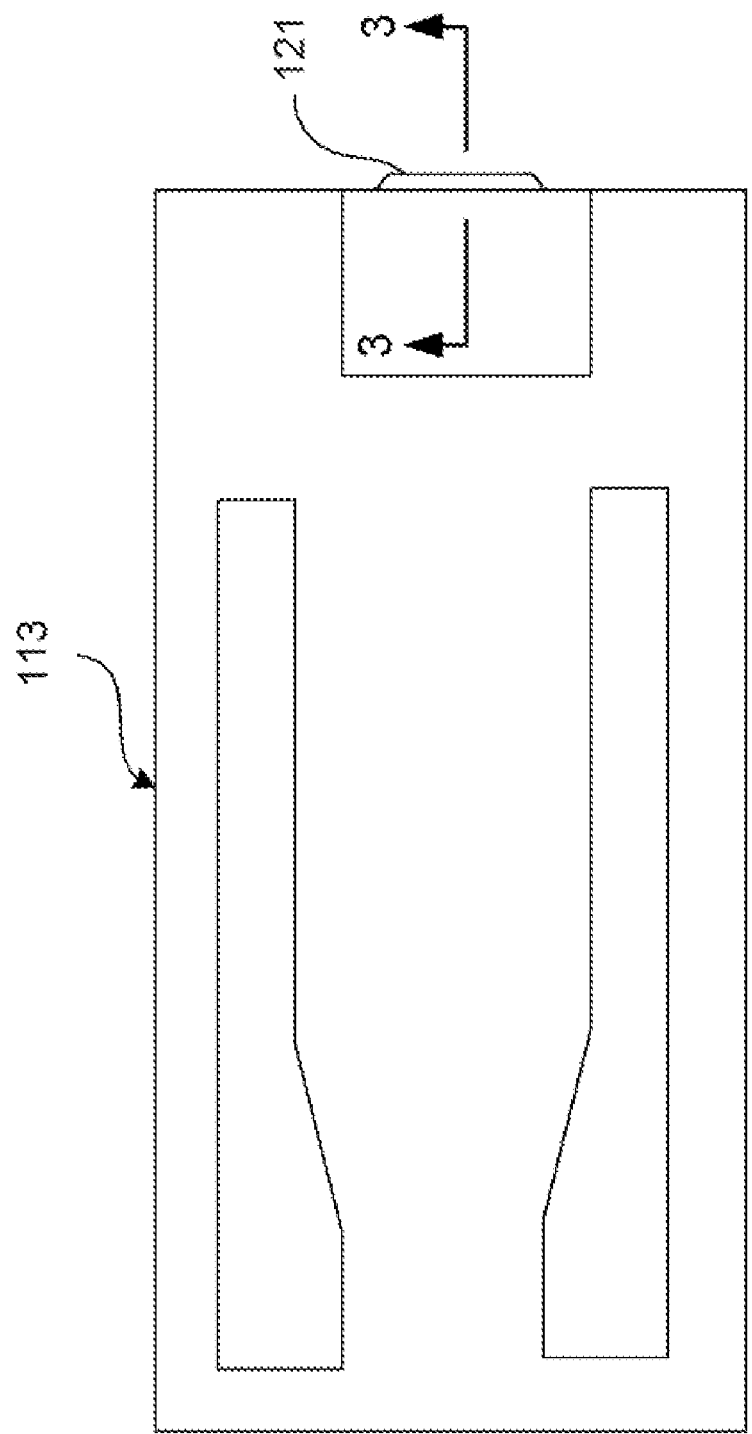
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
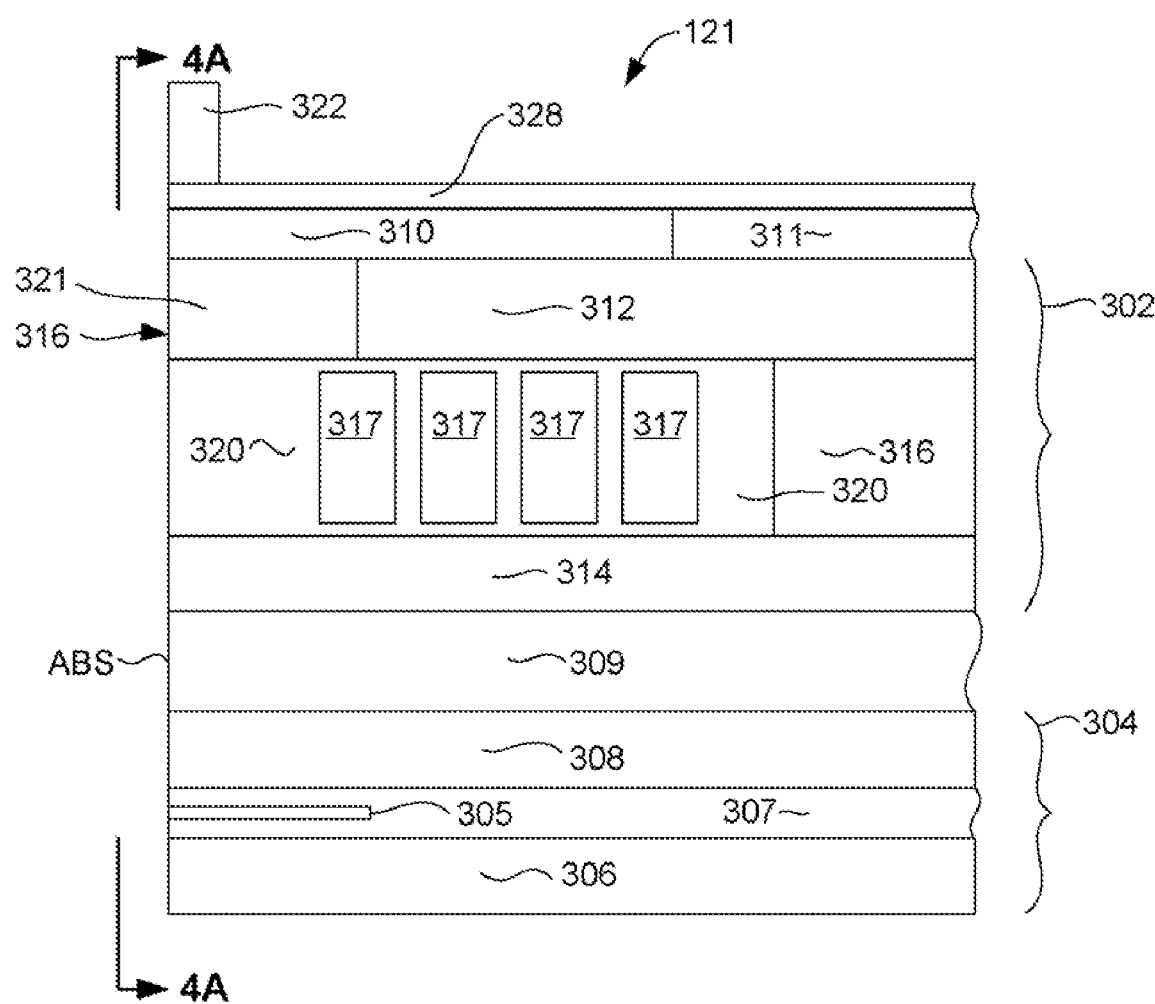
FIG. 3 is a cross sectional view view, taken from line 3-3 of FIG. 2 and rotated 90 degrees counterclockwise, of a magnetic head according to an embodiment of the present invention

With reference now to FIG. 3, the magnetic head 121 for use in a perpendicular magnetic recording system is described. The head 121 includes a write element 302 and a read element 304. The read element includes a magnetoresistive sensor 305, such as a giant magnetoresistive (GMR). However, the read element 304 could be another type of sensor such as a current in plane (CIP) GMR sensor or, a tunnel junction sensor (TMR) or some other type of sensor. The sensor 305 is located between and insulated from first and second magnetic shields 306, 308 and embedded in a dielectric material 307. The magnetic shields, which can be constructed of for example CoFe or NiFe, absorb magnetic fields, such as those from uptrack or down track data signals, ensuring that the read sensor 304 only detects the desired data track located between the shields 306, 308. A non-magnetic, electrically insulating gap layer 309 may be provided between the shield 308 and the write head 302.

With continued reference to FIG. 3, the write element 302 includes a write pole 310 that is magnetically connected with a magnetic shaping layer 312, and is embedded within an insulation material 311. The write pole has a small cross section at the air bearing surface and is constructed of a material having a high saturation moment, such as NiFe or CoFe. More preferably, the write pole 310 is constructed as a lamination of layers of magnetic material separated by thin layers of non-magnetic material. The write element 302 also has a return pole 314 that preferably has a surface exposed at the ABS and has a cross section parallel with the ABS surface that is much larger than that of the write pole 310. The return pole 314 is magnetically connected with the shaping layer 312 by a back gap portion 316. The shaping layer 312, return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to How through the return pole 314, back gap 316, shaping layer 312 and write pole 310. This magnetic flux causes a write field 321 to be emitted toward an adjacent magnetic medium. The shaping layer 312 is also surrounded by an insulation layer 321 which separates the shaping layer 312 from the ABS. The insulation layers 320, 321, 311 can all be constricted of the same material, such as alumina ($Al_2O_3$) or of different electrically insulating materials.

Figure 4:
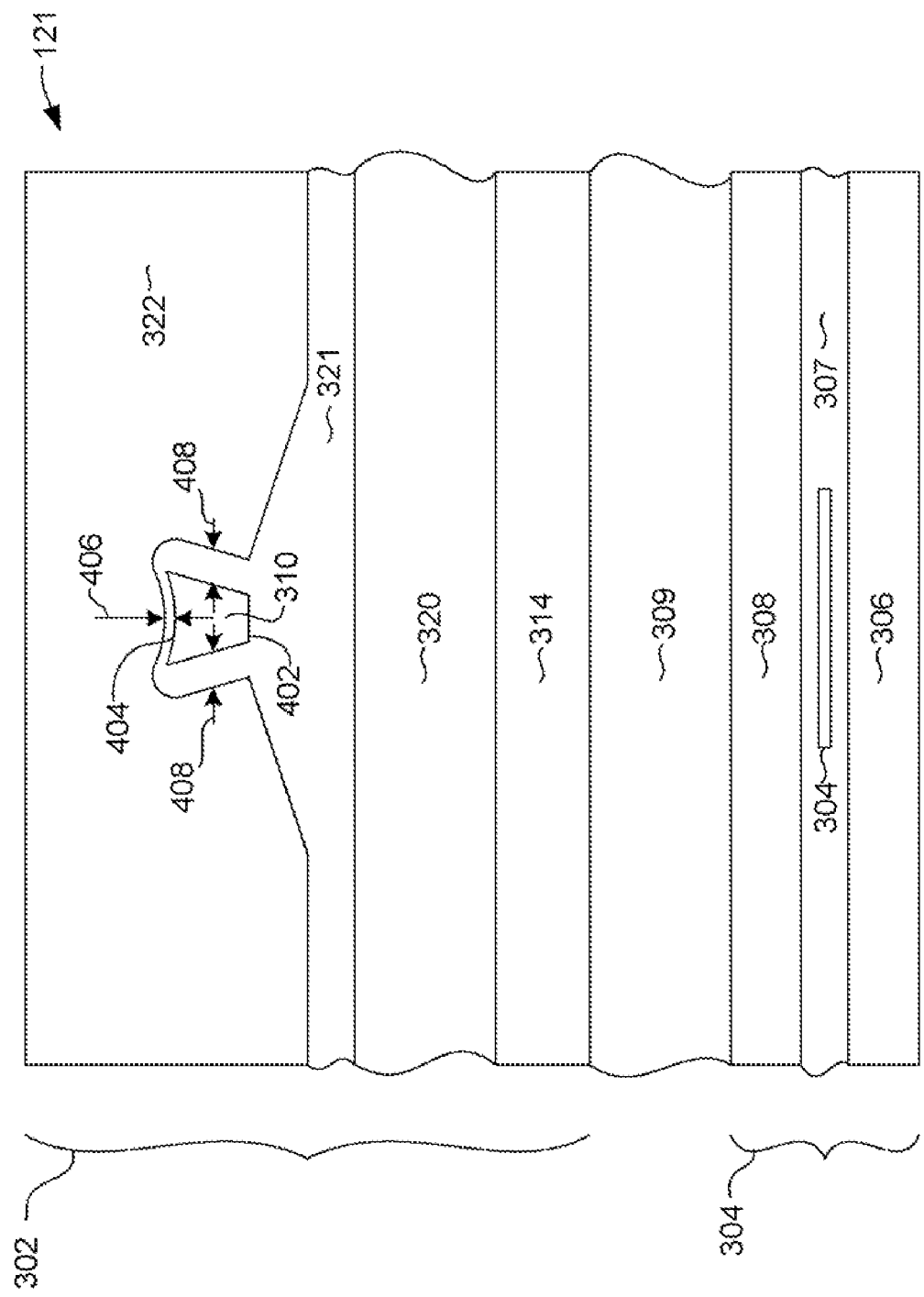
FIG. 4 is an ABS view of the write head taken from line 4-4 of FIG. 3.

The write head element 302 also includes a trailing shield 322, which can be constructed of a magnetic material such as NiFe or some other material. With reference to FIG. 4, the trailing shield 322 can be configured to wrap around the write pole 310 to provide side shielding as well as trailing shielding from stray magnetic fields. These stray magnetic fields can be from the write head 302 itself, or could also be from adjacent track signals or from magnetic fields from external sources.

With continued reference to FIG. 4, the write pole 310 has a leading edge 402 and a trailing edge 404. The write pole is preferably narrower at the leading edge 404 than at the trailing edge, forming the write pole with a tapered or trapezoidal shape. The trailing edge 404 is provided with a concave shape. This curvature of the trailing edge 404 improves transition curvature, thereby improving performance of the write element 302. The trailing shield 322 is separated from the trailing edge of the write pole 310 by a trailing gap 406, and (if provided with side shielding) is separated from each side of the write pole 310 by a side gap 408. As mentioned, above, the thickness of the trailing shield gap 406 is critical and must be carefully controlled. The side gaps 408 are preferably thicker than the trailing gap 406 and, although the side gap thickness must also be well controlled, the thickness of the side gap 406 does not need to be as tightly controlled as the thickness of the trailing gap 406.

The trailing gap 406 preferably has a thickness of about half of the distance between the write pole 310 and the magnetically soft underlayer of the magnetic medium (not shown) when the head 302 is in use. Therefore, the trailing gap 406 can have a thickness of 20-60 nm or about 40 nm. The side gap can have a thickness of 40-160 or about 100 nm.

Method for Constructing a Write Pole with a Concave Trailing Edge

With reference now to FIG. 5-12, a method for constructing a write head 302 according to an embodiment of the invention is described. FIGS. 5-12 illustrate the construction of the write pole 310 and trailing shield 322 described earlier with reference to FIGS. 3 and 4. The following described method assumes that other portions of the head 302 such as the return pole 314 and coil 317 have already been constructed.

Figure 5:
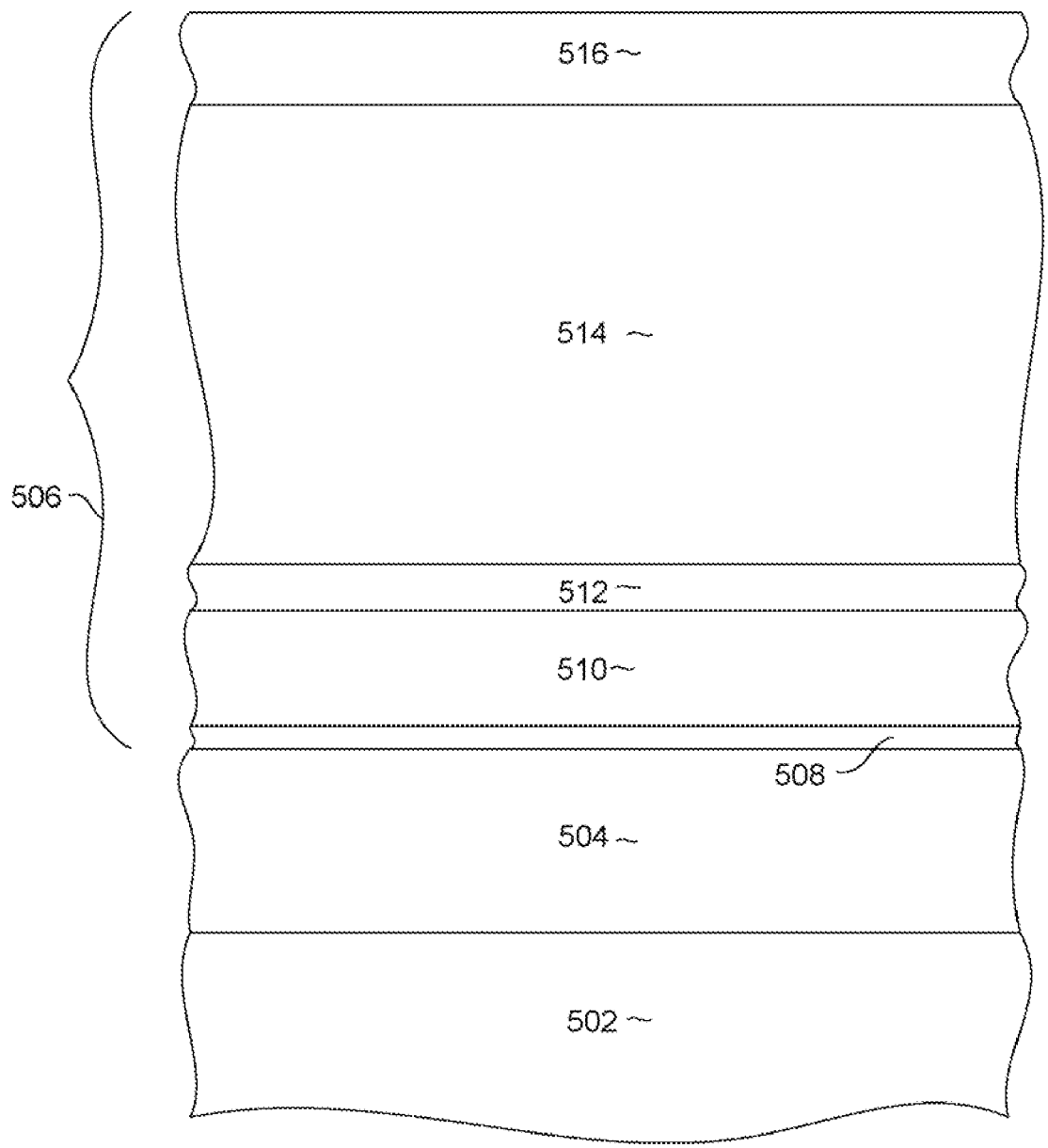
FIGS. 5-12 are views of a write head in various intermediate stages of manufacture illustrating a method of manufacturing a write head according to a possible embodiment of the invention

With reference then to FIG. 5, a substrate 502 is provided, which may include all or a portion of the insulation layer 320 and/or shaping layer 312 described earlier with reference to FIG. 3. A magnetic write pole material 504 is deposited over the substrate. The write pole material 504 can be a single layer of magnetic material, but is preferably a lamination of layers of magnetic material such as CoFe separated by thin layers of non-magnetic material such as Cr or NiCr.

A mask structure 506 is formed over the write pole material 504. The mask structure 506 can include a thin hard mask layer 508 constructed of alumina ($Al_2O_3$), which will be referred to as a thin alumina mask (TAM) 508. The thin alumina mask 508 can be deposited 20-80 nm thick or about 50 nm thick. A mask material that is removable by reactive ion etching (RIEable layer) 510 is formed over the TAM layer 508. The RIAable layer 510 can be constructed of, for example, $SiO_2$, $Si_3N_4$, DLC and can have a thickness of 20-60 nm or about 40 nm. The thickness of the RIEable layer 510 can be varied to control a write pole trailing edge curvature as will be explained further below.

With continued reference to FIG. 5, an ion milling end point detection layer 512 is deposited over the RIAble layer 510. The end point detection layer 512 can be constructed of several different materials, but is preferably AlTiO, and can have a thickness of, for example, 5-15 nm or about 10 nm. A layer of organic mask material 514, referred to herein as "resist", can be deposited over the end point detection layer 512. The resist 514 can be a photo-insensitive organic material, for example, DURAMIDE® or some other suitable material. The resist can be 1-1.4 micron thick or about 1.2 micron thick. A layer of imaging resist material 516 such as photoresist or thermal image resist is then deposited at the top of the mask layer structure 506.

Figure 6:
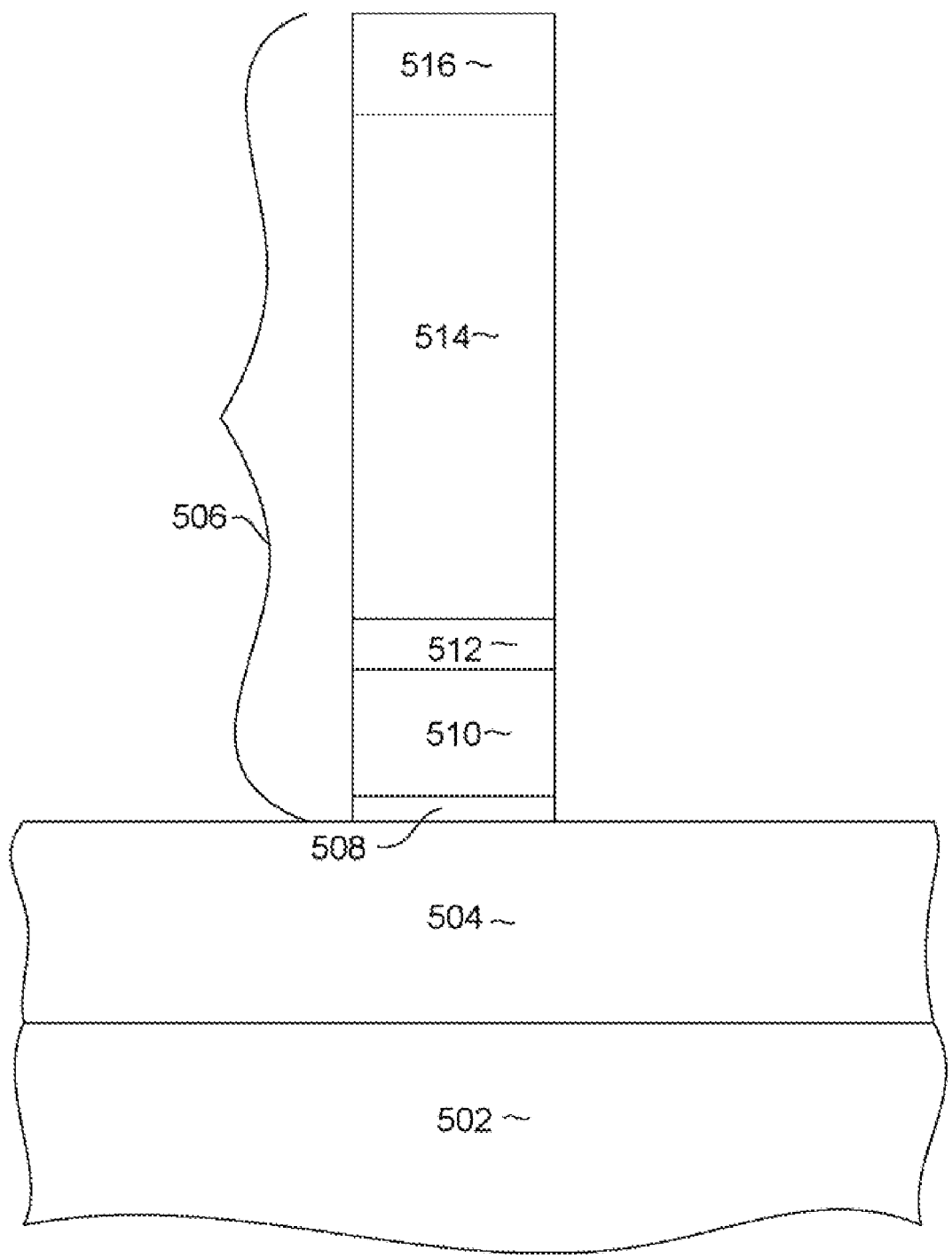

With reference now to FIG. 6, the resist layer 516 is photolithographically patterned do define a desired write pole shape and track width. One or more material removal processes such as reactive ion etching (RIE) and reactive ion beam etch (RIBE) can then be performed to transfer the image onto underlying mask layers 514, 512, 510, 508.

Figure 7:
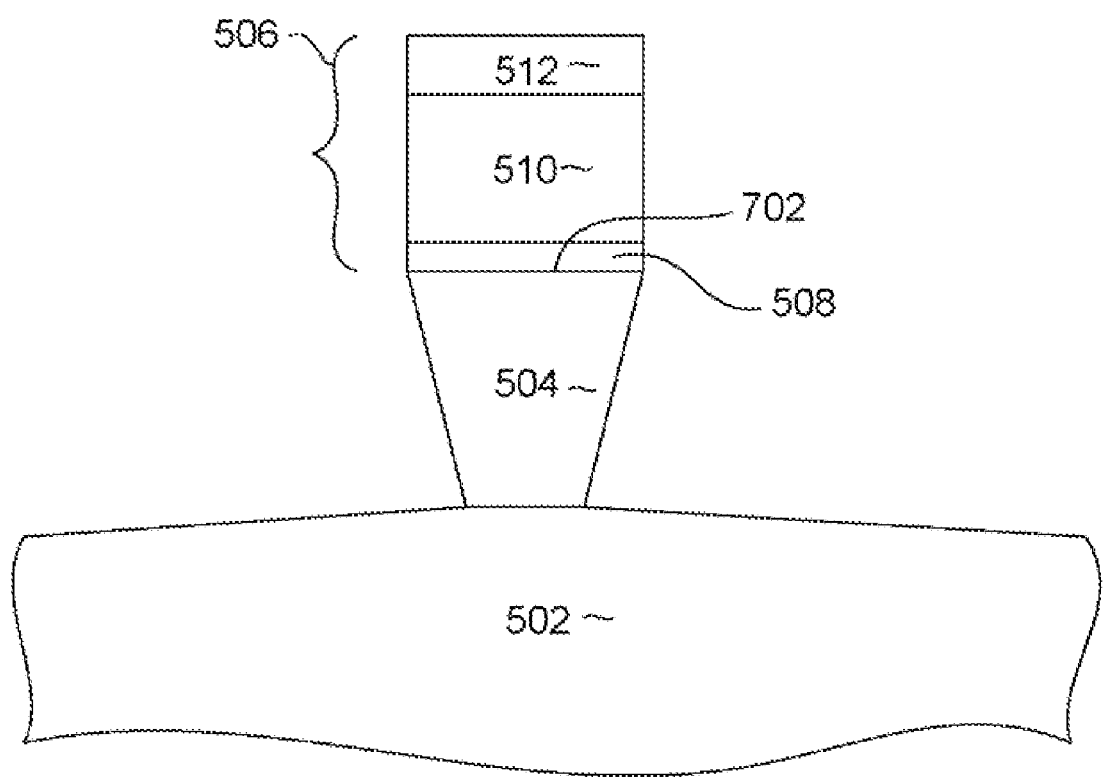

With reference now to FIG. 7, a first ion milling is performed to remove portions of the write pole material 504. The ion milling can be performed in a sweeping fashion with the ion milling being performed at one or more angles relative to normal, in order to form the write pole material 504 with a trapezoidal shape, having tapered side walls as shown. The TAM layer 508 protects the trailing edge 702 of the write pole layer during this ion milling to ensure that the write pole 504 has a well defined and well controlled track width at the trailing edge 702. The residual resist mask material 514 can be removed using an N-methylpyrrolidone (NMP) strip.

Figure 8:
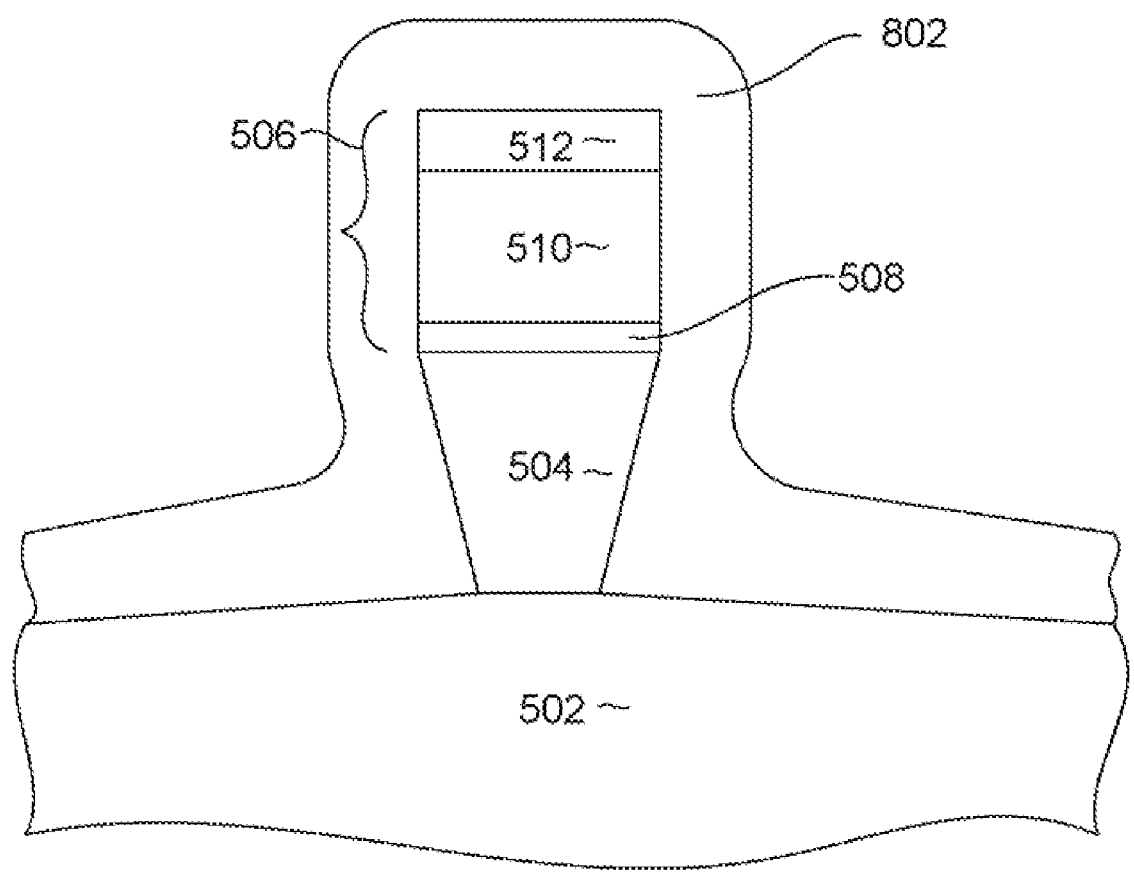

With reference to FIG. 8, a non-magnetic side gap material layer 802 is deposited. This side gap material layer 802 can be constructed of various non-magnetic materials, but is preferably constructed of alumina deposited by a conformal deposition method such as atomic layer deposition (ALD) or chemical vapor deposition (CVD), and for purposes of simplicity will hereinafter be referred to as the ALD layer 802.

Figure 9:
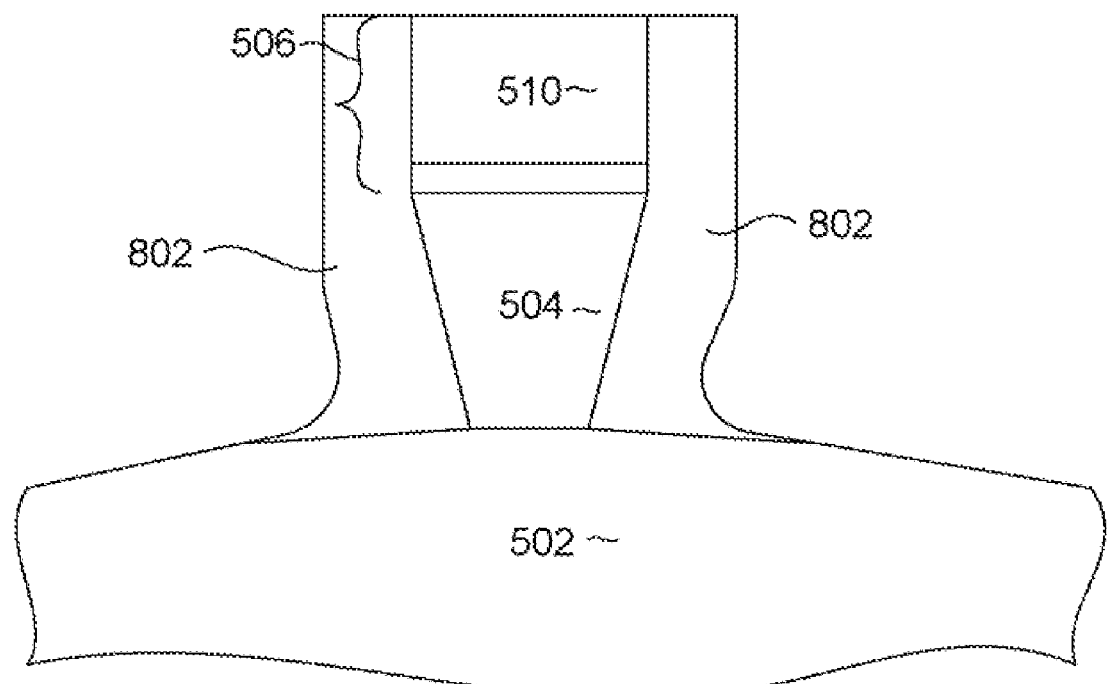

With reference now to FIG. 9, a second ion milling is performed to remove the portion of the ALD layer 802 that is disposed over the write pole 504 and remaining mask 506. This second ion milling is preferably performed at an angle, with the wafer being held on a rotating chuck (not shown). Preferably, the second ion milling is performed at an angle of about 45 degrees with respect to normal. The second ion milling is performed sufficiently to remove the end point detection layer 512 (FIG. 8), and as the name would suggest, the end point detection layer 512 indicates when the second ion milling should be terminated, such as by detecting the presence of Ti in the ion milling chamber. The presence of the Ti can be detected by performing a Secondar Ion Mass Spectroscopy (SIMS). The removal of the upper portions of the ALD layer 802 causes the remaining ALD layer material 802 to form side walls at either side of the write pole. As can be seen, these ALD side walls 802 have upper portions 902 that extend above the trailing edge 702 of the write pole 504. By controlling the angle at which the ion milling is performed, the top end of the ALD side walls 802 and the RIEable layer 510 can form a substantially planar surface. Although this is not necessary to practice the invention, it is preferable.

Figure 10:
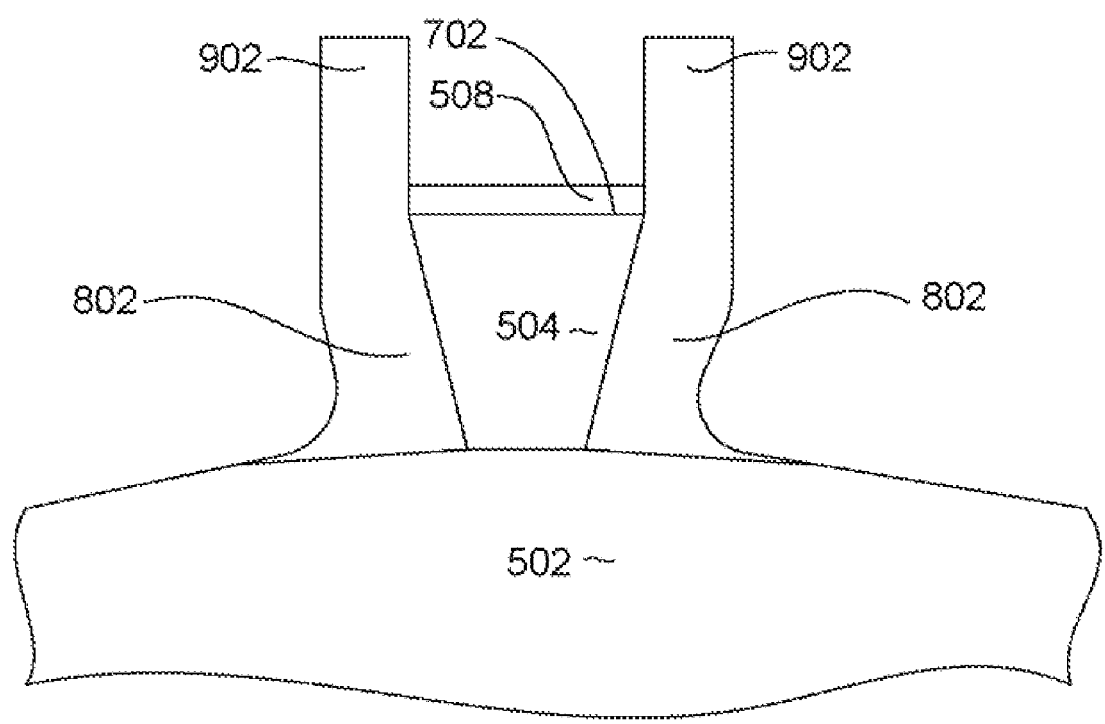

Then, with reference to FIG. 10, a reactive ion etch (RIE) can be performed to remove the RIEable layer 510. The RIE process employed to remove the RIEable layer 510 is one that is selected to preferentially remove the RIEable layer 510, while leaving the other layers such as the ALD side walls 802 and underlying TAM 508 substantially intact. For example, if the RIEable layer 510 is constructed of SiN, then the RIE could be performed using a fluorine chemistry.

Figure 11:
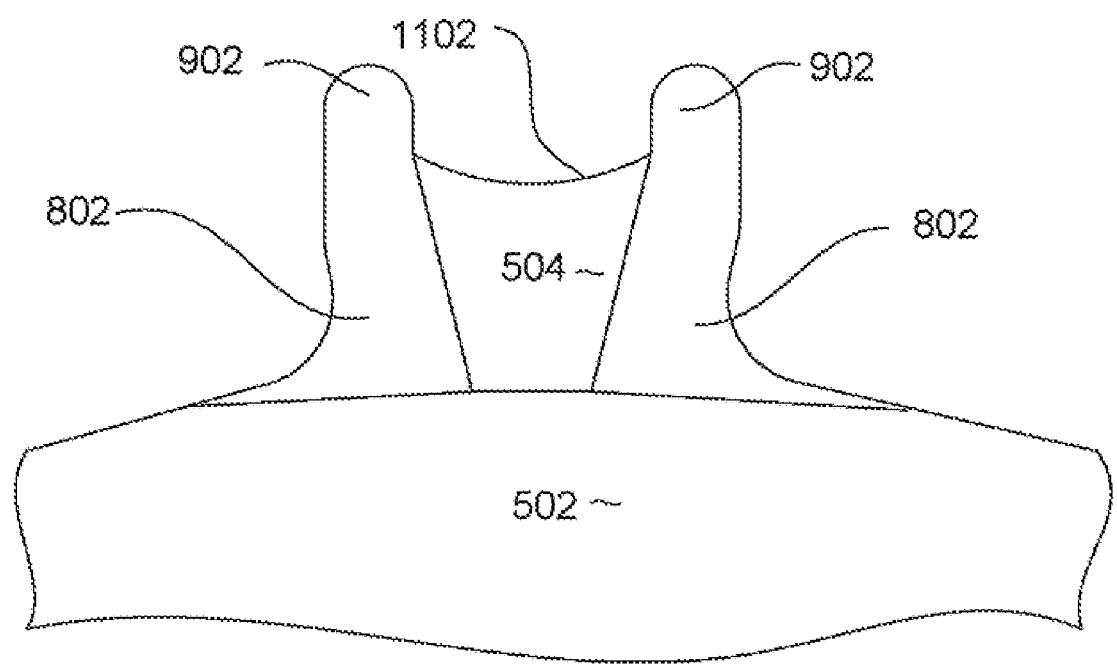

Then, with reference to FIG. 11, a third ion milling is performed. This third ion milling is performed sufficiently to remove the TAM layer 508 (FIG. 10), and is performed in such a manner as to form a concave trailing edge 1102 on the write pole 504, the amount of concavity or curvature being controllable as explained below. The second ion milling is performed at an angle relative to normal so that, shadowing from the upper portions 902 of the ALD side walls causes the outer portions of the write pole trailing edge to be removed at a slower rate than the inner portions. Therefore, the amount of concavity (ie. the curvature of the concave trailing edge 1102) can be controlled by to factors, (1) the angle of the ion milling, and (2) the height of the upper portions 902 of the ALD side walls 802. To tins end, the third ion milling used to form the concave trailing edge of the write pole 504 is preferably performed at an angle of 30-60 degrees relative to normal. Furthermore, as provided by the present invention, the amount by which the upper portions 902 extend above the write pole can be carefully controlled by controlling the thickness of the RIEable layer 510 (FIG. 9). Therefore, the present Invention allows the curvature of the concavity of the trailing edge 1102 to be very accurately controlled with very little within wafer or wafer-to-wafer variation.

Figure 12:
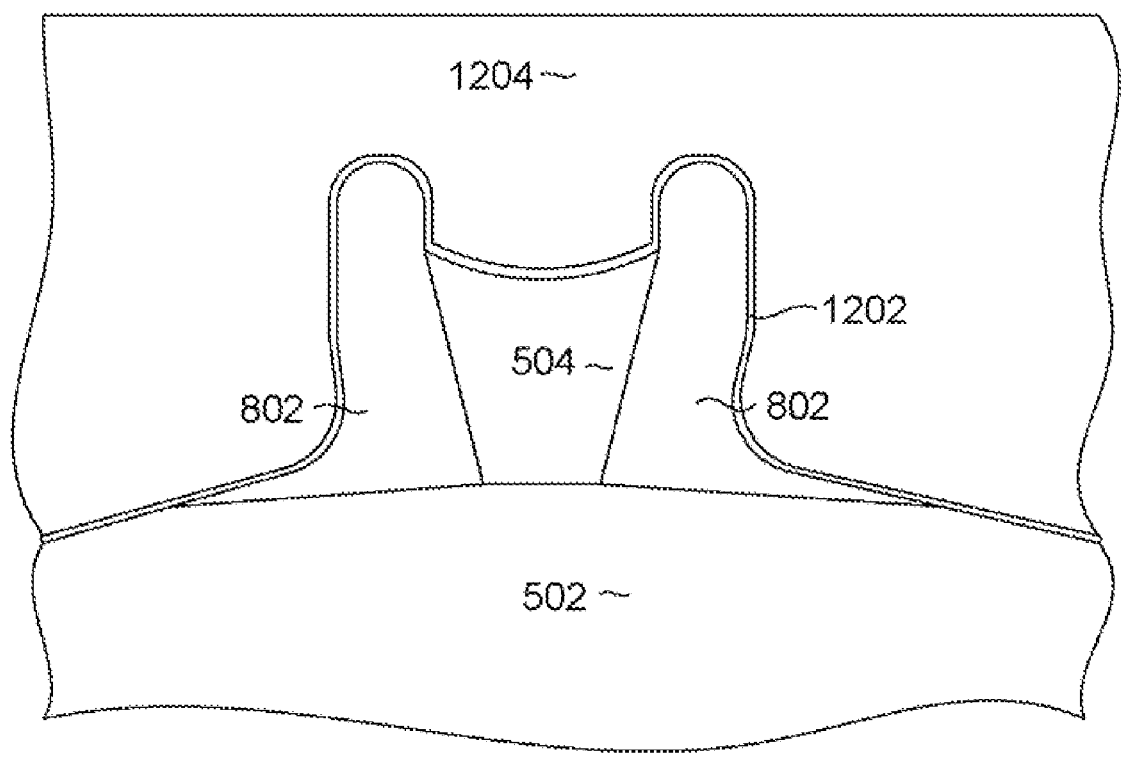

With reference now to FIG. 12, a non-magnetic material is deposited to form a trailing gap 1202. The non-magnetic layer 1202 can be of various materials such as Rh, Ru, Ir or some other material, and is deposited to such a thickness that it defines a trailing gap for a trailing shield. Therefore, the ALD side wall material 802 should have been previously deposited to such a thickness that the combined thicknesses of the ALD side wall 802 and the non-magnetic trailing gap material 1102 together define a desired side gap thickness. The non-magnetic trailing gap material 1102 is preferably deposited by a conformally by physical vapor deposition (PVD), ion beam depositon (IBD), etc.

With continued reference to FIG. 12, a layer of magnetic material is deposited to from a trailing magnetic shield 1204 that wraps around the sides of the write pole 504. The magnetic layer 1204 can be, for example, NiFe and can be deposited by electroplating. If the previously deposited non-magnetic layer 1202 was an electrically conductive material such as Rh, then that layer 1202 can also conveniently be used as a seed layer for electroplating the trailing shield 1204.

Figure 13:
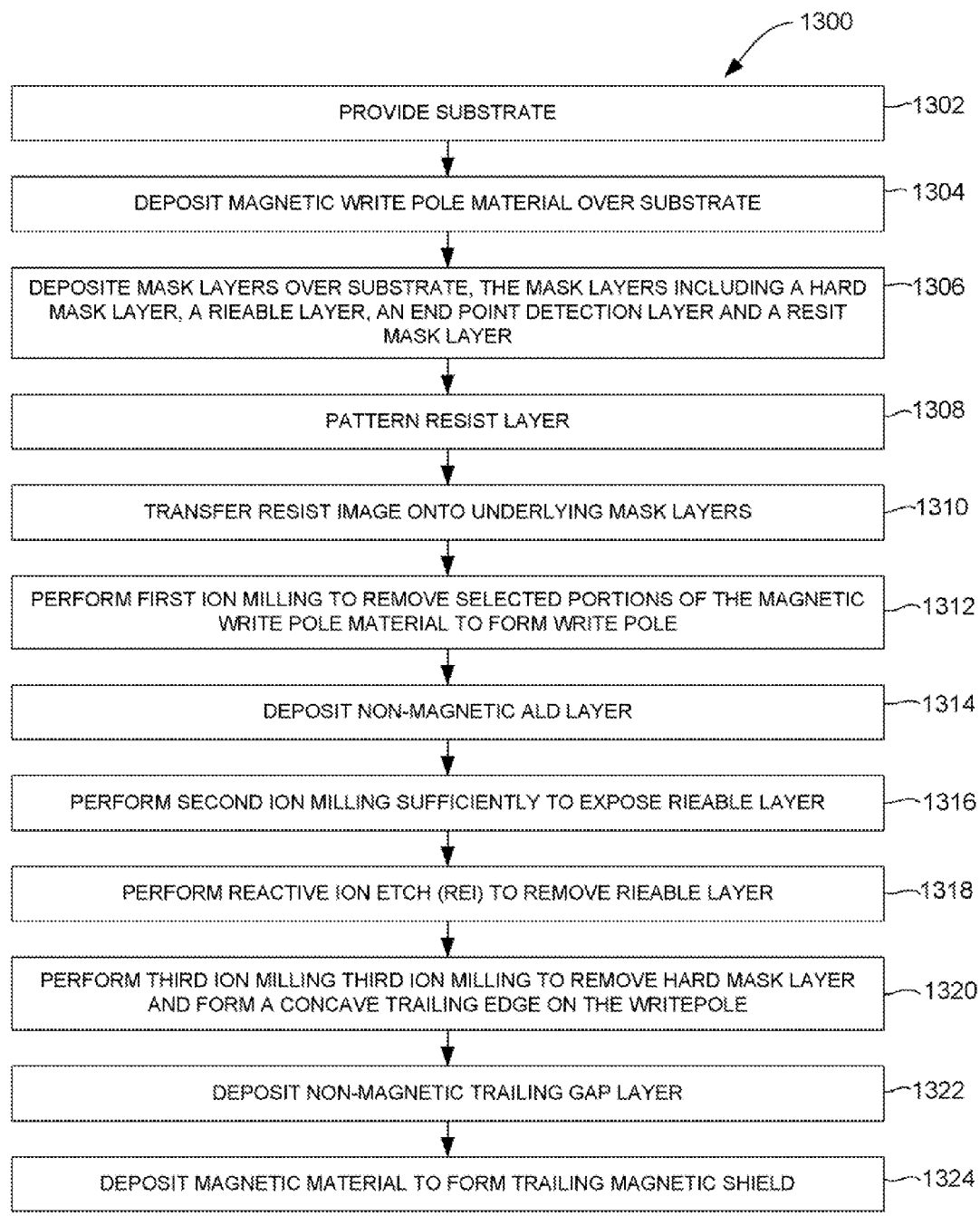
FIG. 13 is a flow chart illustrating a method of manufacturing a write head; and FIG, 14 is flow chart further summarizing a method of manufacturing write head according to an embodiment of the invention.

With reference now to FIG. 13, a method 1300 for manufacturing a write pole can be summarized as follows. First in a step, 1302 a substrate is provided. This substrate could include, for example, all or a portion of the shaping layer 312 and the insulation layer 321. Then, in a step 1304 a magnetic write pole material is deposited. This magnetic material can be of various materials, but is preferably a laminated structure including a plurality of magnetic layers separated by thin, non-magnetic layers. The write pole material could also include a non-magnetic capping layer formed as a top layer.

Then, in a step 1306 a plurality of mask layers are deposited. These mask layers can include a hard mask such as a thin alumina layer (TAM), a RIEable layer such as SiN, an endpoint detection layer such as AlTiO, an organic resist layer such as DURAMIDE®, and a resist such as photoresist or thermal image resist. In a step 1308 the resist layer is patterned, and then in a step 1310 the image of the patterned resist layer is transferred onto all or some of the underlying mask layers. The image of the patterned resist layer can be transferred onto the underlying layers by using one or more material removal processes such as reactive ion etching (RIE) and reactive ion beam etching (RIBE)

In a step 1312, a first ion milling is performed to transfer the image of the mask structure onto the underlying write pole material, thereby forming a write pole. Then, in a step 1314 a non-magnetic material such as alumina is deposited by a method such as atomic layer deposition (ALD layer). In a step 1316, a second ion milling is performed to remove a portion of the ALD layer that extends over the top of the mask layer and to remove a portion of the remaining mask layers. The second ion milling can be terminated when the RIEable layer has been reached, using the endpoint detection layer as an indicator of when the second ion milling should be terminated.

In a step 1318, a reactive ion etch RIE can be performed to remove the RIEable layer, and then, in a step 1320, a third ion milling can be performed to remove the hard mask layer and to form the write pole with a concaved trailing edge. Then, in a step 1322 a non-magnetic, trailing gap layer such as Rh can be deposited, and in a step 1324 a magnetic material, such as NiFe can be deposited to form a wrap-around, trailing, magnetic shield.

Figure 14:
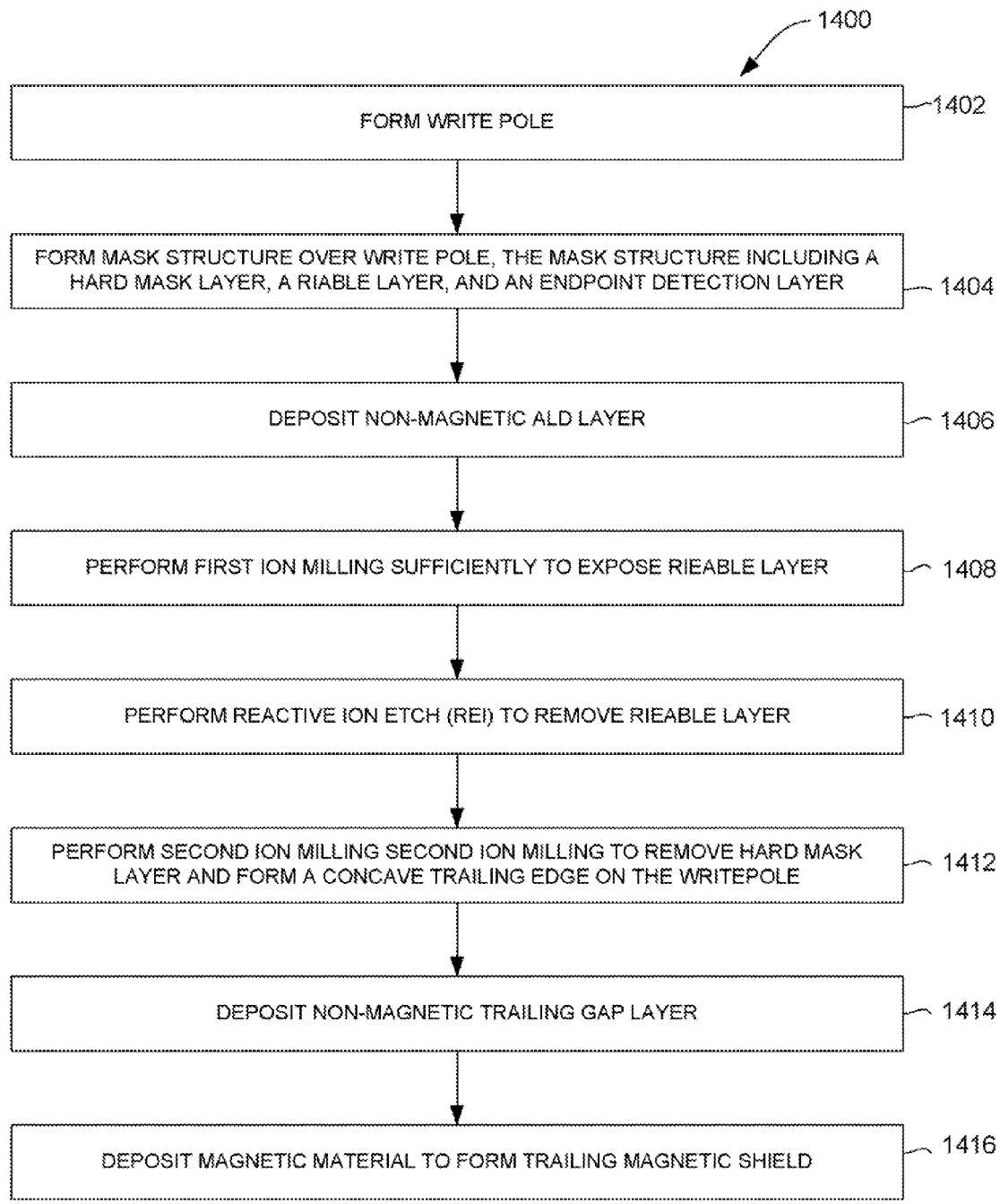

With reference now to FIG. 14, a method 1304 for manufacturing a write head can further be summarized as follows, from a perspective of the write head already having been formed. In a step 1402 a magnetic write pole is formed. In a step 1404 a mask structure is formed over the write pole. The mask structure can be formed from layers deposited prior to the formation of the write pole as mention above, or by any other means. The mask structure can include a hard mask layer, a RIEable layer, and an endpoint detection layer. Then, in a step 1406 a non-magnetic ALD layer is deposited. In a step, 1408 a first ion milling step is performed to remove a portion of the ALD layer disposed over the write pole and mask. This first ion milling (which corresponds with the second ion milling described above with reference to FIG. 13) is preferably performed sufficiently to expose the RIEable layer, using the end-point detection layer as an indicator of when to stop the ion milling.

Then, in a step 1410 a reactive ion etch (RIE) is performed to remove the RIEable layer. Then, in a step 1412 a second ion milling is performed to remove the hard mask layer and to form the write pole with a concave trailing edge surface. In a step 1414 a non-magnetic trailing gap material such as Rh is deposited. Then, in a step 1416 a magnetic material such as NiFe is deposited to form a trailing, wrap-around magnetic shield.

While various embodiments have been described, it should be understood that they have been presented by way of example, only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head for perpendicular magnetic recording, comprising:
   depositing a magnetic write pole material;
   forming a mask structure over the write pole material, the mask structure including a hard mask layer, a RIEable layer and an endpoint detection layer;
   performing a material removal process to remove portions of the magnetic write pole material that are not protected by the mask structure, thereby forming a write pole;
   depositing a non-magnetic layer over the write pole and mask structure;
   performing a first ion milling sufficiently to expose the RIEable layer;
   performing a reactive ion etching to remove the RIEable layer; and
   performing a second ion milling sufficiently to remove the hard mask layer and sufficiently to form the write pole with a concave trailing edge surface.

2. The method as in claim 1 wherein the second ion milling is performed at an angle relative to normal, and wherein the angle is chosen to provide a desired amount of concavity in the concave trailing edge surface.

3. The method as in claim 1 wherein the RIEable layer is deposited to a thickness that is chosen to provide a desired amount of concavity of the concave trailing edge surface.

4. The method as in claim 1 wherein:
   the second ion milling is performed at an angle relative to normal, and wherein the angle is chosen to provide a desired amount of concavity in the concave trailing edge surface.

5. The method as in claim 1 wherein the reactive ion etching to remove the RIEable layer results in upper portions of the non-magnetic layer extending above the write pole by a distance that controls an amount of concavity of the concave trailing edge surface.

6. The method as in claim 1 wherein the RIEable layer comprises $SiO_2$ or $Si_3N_4$ and the reactive ion etching is performed using a fluorine chemistry.

7. The method as in claim 1 wherein the RIEable layer has a thickness of 20-60 nm.

8. The method as in claim 1 wherein the RIEable layer has a thickness of about 40 nm.

9. The method as in claim 1 further comprising, after performing the second ion milling, depositing a non-magnetic trailing gap layer, and depositing a magnetic material to form a wrap around trailing shield.

10. The method as in claim 1 wherein the second ion milling is performed at an angle of 30 to 60 degrees with respect to normal.

11. The method as in claim 1 wherein the second ion milling is performed at an angle of about 45 degrees with respect to normal.

12. The method as in claim 1, wherein the hard mask layer comprises alumina.

13. The method as in claim 1 wherein the end point detection layer comprises AlTiO.

14. The method as in claim 1 wherein the first ion milling is performed while detecting for the presence of a material from the end point detection layer and wherein a detected presence of a material in the end point detection layer indicates a point at which the first ion milling should be terminated.

15. A method for manufacturing a magnetic write head for perpendicular magnetic data recording, comprising:
providing a substrate;
depositing a magnetic write pole material over the substrate;
depositing plurality of mask layers over the magnetic write pole material, the mask layers including a hard mask layer, a RIEable layer formed over the hard mask layer, an end point detection layer formed over the RIEable layer; and a resist layer above the endpoint, detection layer;
photolithographically patterning the resist layer to form the resist layer with a pattern;
performing a material removal process to transfer the image of the resist layer onto one or more of the underlying mask layers;
performing a first ion milling to remove a portion of the magnetic write pole material that is not covered by the mask layers, thereby forming a write pole;
depositing a non-magnetic layer;
performing a second ion milling to remove a portion of the non-magnetic layer disposed over the write pole and mask structure, the second ion milling being performed sufficiently to expose the RIEable layer;
performing a reactive ion etching to remove the RIEable layer; and
performing a third ion milling to remove the hard mask layer and to form the write pole with a concave trailing edge;
wherein the RIEable layer comprises $SiO_2$ or $Si_3N_4$, the end point detection layer comprises AlTiO and the non-magnetic layer comprises alumina.

16. The method as in claim 15 wherein the third ion milling is performed at an angle relative to normal, the angle being chosen to form the concave trailing edge with a desired amount of concavity.

17. The method as in claim 15, wherein the RIEable layer has a thickness that is chosen to provide the concave trailing edge of the write pole with a desired amount of concavity.

18. The method as in claim 15, wherein:
the RIEable layer has a thickness;
the third ion milling is performed at an angle relative to normal; and
the RIEable layer thickness and third ion milling angle are both chosen to form the concave trailing edge of the write pole with a desired amount of concavity.

19. A method for manufacturing a magnetic write head for perpendicular magnetic data recording, comprising:
providing a substrate;
depositing a magnetic write pole material over the substrate;
depositing plurality of mask layers over the magnetic write pole material, the mask layers including a hard mask layer, a RIEable layer formed over the hard mask layer, an end point detection layer formed over the RIEable layer; and a resist layer above the endpoint detection layer;
photolithographically patterning the resist layer to form the resist layer with a pattern;
performing a material removal process to transfer the image of the resist layer onto one or more of the underlying mask layers;
performing a first ion milling to remove a potion of the magnetic write pole material that is not covered by the mask layers, thereby forming a write pole;
depositing a non-magnetic layer;
performing a second ion milling to remove a portion of the non-magnetic layer disposed over the write pole and mask structure, the second ion milling being performed sufficiently to expose the RIEable layer;
performing a reactive ion etching to remove the RIEable layer; and
performing a third ion milling to remove the bard mask layer and to form the write pole with a concave trailing edge;
wherein the RIEable layer has a thickness of 20-60 nm.

20. The method as in claim 15, further comprising, after performing the third ion milling, depositing a non-magnetic trailing gap layer and a magnetic trailing shield material.

21. The method as in claim 15 further comprising, while performing the second ion milling, detecting for the presence of the endpoint detection layer, and terminating the second ion milling based on the detection of the endpoint detection layer.

* * * * *

UNITED STATES PATENT AND TRADEMARK OFFICE
CERTIFICATE OF CORRECTION

PATENT NO. : 7,506,431 B2
APPLICATION NO. : 11/744022
DATED : March 24, 2009
INVENTOR(S) : Hsiao et al.

It is certified that error appears in the above-identified patent and that said Letters Patent is hereby corrected as shown below:

In claim 19, column 12, line 31, replace "potion" with --portion--.

In claim 19, column 12, line 41, replace "bard" with --hard--.

Signed and Sealed this

Eighth Day of June, 2010

David J. Kappos
*Director of the United States Patent and Trademark Office*